US010409917B1

(12) United States Patent
Fuerstenau

(10) Patent No.: US 10,409,917 B1
(45) Date of Patent: Sep. 10, 2019

(54) MACHINE INTELLIGENCE SYSTEM FOR MACHINE TRANSLATION QUALITY EVALUATION BY IDENTIFYING MATCHING PROPOSITIONS IN SOURCE AND TRANSLATED TEXT STRINGS

(71) Applicant: Amazon Technologies, Inc., Seattle, WA (US)

(72) Inventor: Hagen Fuerstenau, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 160 days.

(21) Appl. No.: 15/603,938

(22) Filed: May 24, 2017

(51) Int. Cl.
*G06F 17/28* (2006.01)

(52) U.S. Cl.
CPC ........ *G06F 17/2854* (2013.01); *G06F 17/289* (2013.01)

(58) Field of Classification Search
USPC ........................................................... 704/2
See application file for complete search history.

(56) References Cited

U.S. PATENT DOCUMENTS

| 7,653,531 | B2* | 1/2010 | Sneddon | ............. | G06F 17/2836 704/10 |
| 8,594,992 | B2* | 11/2013 | Kuhn | ................... | G06F 17/2827 704/2 |
| 8,700,383 | B2* | 4/2014 | Sneddon | ............... | G06F 17/289 704/4 |
| 2013/0080144 | A1* | 3/2013 | Kamatani | ........... | G06F 17/2872 704/2 |
| 2014/0195219 | A1* | 7/2014 | Sneddon | ............... | G06F 17/289 704/2 |

* cited by examiner

*Primary Examiner* — Satwant K Singh
(74) *Attorney, Agent, or Firm* — Lee & Hayes, P.C.

(57) ABSTRACT

A mechanism is disclosed for evaluating the quality of a machine translation system. Propositions are identified within a source language string and within a translation of the source language string generated by a machine translation system. The propositions can be identified using an automated mechanism or using human translators through the use of a human intelligence task site. Once the propositions have been identified, the propositions identified in the source language string can be compared to the propositions identified in the translated target language string. The results of the comparison can be utilized to compute a quality score for the translation. A final quality score can be generated for the machine translation system by repeating this process for multiple source language strings. The final quality score can then be utilized to improve the quality of models utilized by the machine translation system.

20 Claims, 9 Drawing Sheets

MACHINE INTELLIGENCE SYSTEM FOR MACHINE TRANSLATION QUALITY EVALUATION BY IDENTIFYING MATCHING PROPOSITIONS IN SOURCE AND TRANSLATED TEXT STRINGS

BACKGROUND

Accurate measurement of the translation quality of machine translation systems is essential to improve machine translation algorithms. A wide range of metrics for evaluating the quality of machine translated text have been proposed and are used for various purposes. Automatically generated metrics, such as Bilingual Evaluation Understudy ("BLEU") scores, Metric for Evaluation of Translation with Explicit ORdering ("METEOR") scores, Human-targeted Translation Error Rate ("HTER") scores, and others, compare the output of a machine translation system to human-generated reference translations to quantify the quality of the output generated by the machine translation system. Once a set of human reference translations has been provided, automatically generated metrics such as these can be computed quickly. Often, however, automatically generated metrics do not perfectly correspond to translation quality as perceived by humans.

Other mechanisms for evaluating translation quality can also be utilized in which humans judge the quality of machine translated output. These mechanisms can be more reliable than automatically generated metrics. However, these mechanisms carry their own challenges, such as subjectivity and disagreement between human annotators as to translation quality.

Because of the challenges described above, the use of existing mechanisms for evaluating the quality of machine translations can result in inaccurate quality measurements of machine translated output. Inaccurate quality measurements of machine translated output can, in turn, result in unnecessary retraining of machine translation models, thereby wasting valuable computing resources and power. For example, a machine translation quality evaluation that indicates that the quality of translations generated by a machine translation system is lower than it actually is can result in significant unnecessary retraining of models utilized by the machine translation system.

The disclosure made herein is presented with respect to these and other considerations.

DETAILED DESCRIPTION

Figure 1:
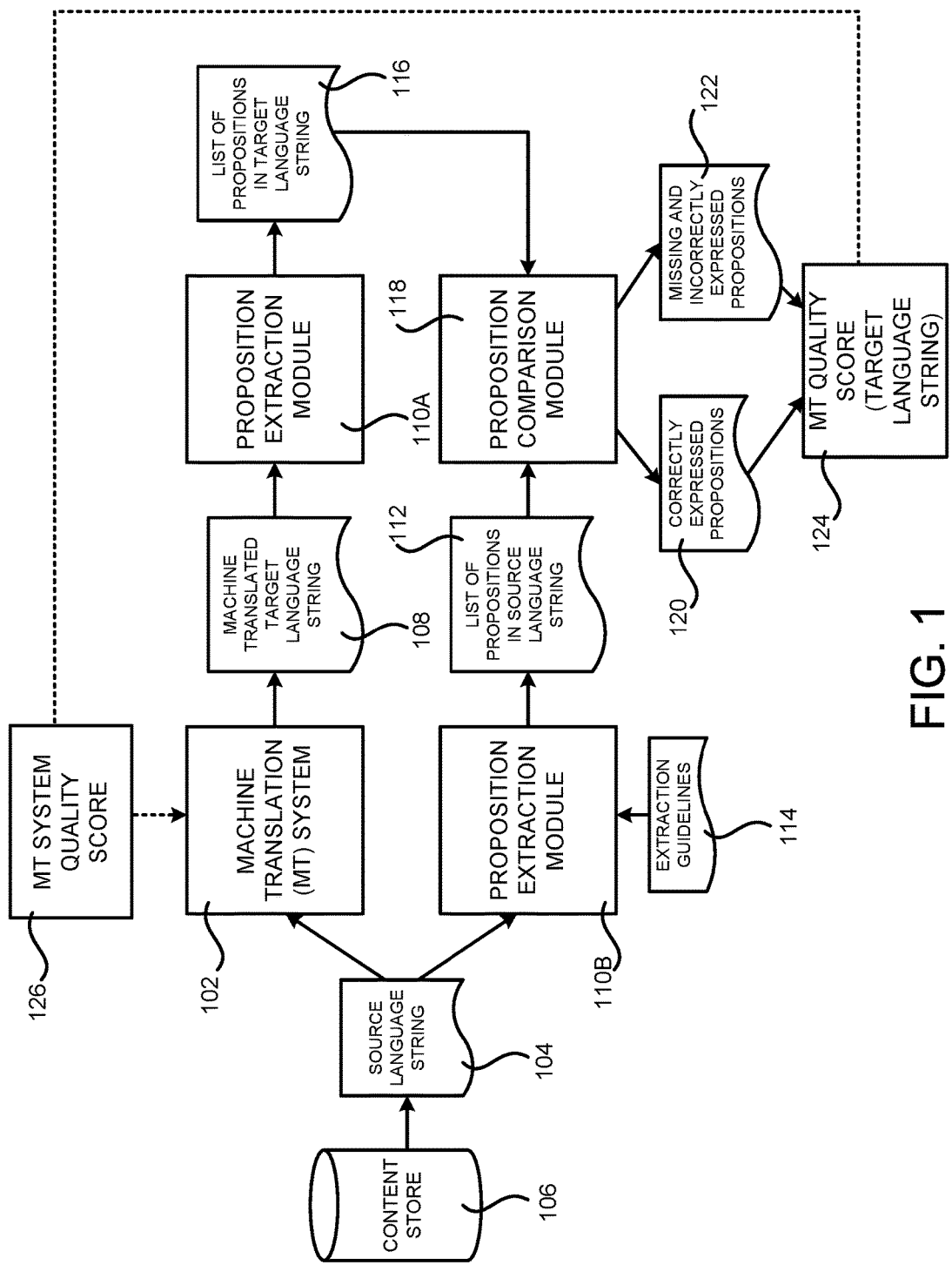
FIG. 1 is a computing system architecture diagram showing aspects of a computing system configured to provide functionality for evaluating machine translation quality by matching propositions in source and translated strings, according to one particular configuration.

The following detailed description is directed to technologies for evaluating machine translation quality by matching propositions in source language and translated target language strings. Through an implementation of the disclosed technologies, measurements of machine translation quality can be generated that are more accurate than previous automatically generated and human generated metrics. As a result, unnecessary retraining of models used by machine translation systems can be avoided, thereby saving valuable central processing unit ("CPU") cycles, memory, network bandwidth, power, and, potentially other computing resources. Technical benefits other than those specifically identified herein can also be realized through an implementation of the disclosed technologies.

In order to provide the functionality described briefly above, propositions are identified within a source language string and within a translation of the source language string generated by a machine translation system. The propositions can be identified using an automated mechanism or using human translators through a human intelligence task site. Once the propositions have been identified, the number of propositions identified in the source language string can be compared to the number of propositions identified in the translated target language string. The results of the comparison can be utilized to compute a quality score for the translation. A quality score can be generated for the machine translation system by repeating this process for multiple source language strings. The quality score for the machine translation system can then be utilized to improve the quality of models utilized by the machine translation system. Additional details regarding the various mechanisms described briefly above will be provided below with regard to FIGS. 1-7.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can also be practiced in distributed computing environments, such as a distributed computing network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a computing system architecture diagram showing aspects of a computing system configured to provide functionality for evaluating machine translation quality by matching propositions in source and translated strings, according to one particular configuration. As illustrated in FIG. 1, the technologies disclosed herein can be utilized with a machine translation ("MT") system 102. The MT system 102 is a computing system (i.e. software or a combination of both hardware and software) for translating content expressed in one human-readable language (which might be referred to herein as a "source language") into another human-readable language (which might be referred to herein as a "target language"). In the configuration shown in FIG. 1, for instance, textual source content such as the source language string 104 that is expressed in one human-readable language (e.g. English) can be stored in a content store 106. The MT system 102 can translate the source language string 104 to a target language string 108 that is expressed using another human-readable language (e.g. French or Spanish).

It is to be appreciated that the MT system 102 can utilize various mechanisms to translate human-readable source language strings 104 to human-readable target language strings 108. For example, and without limitation, the MT system 102 might utilize the machine translation pipeline, and other related technologies, described in U.S. patent application Ser. No. 14/867,932, which was filed on Sep. 28, 2015, and entitled "Optimized Statistical Machine Learning System with Rapid Adaptation Capability", and which is expressly incorporated by reference herein in its entirety. The MT system 102 can also utilize other machine translation technologies in other configurations.

As also illustrated in FIG. 1, the MT system 102 is operated in conjunction with a proposition extraction module 110A in one particular configuration. The proposition extraction module 110A is a software component (or a combination software and hardware component) that is configured to generate a list 116 of propositions represented in the machine translated target language string 108. The proposition extraction module 110A can use various algorithms to perform relation extraction and/or semantic role labeling to identify propositions in the translated target language string 108.

As used herein, the term "proposition" refers to an idea about a thing or group of things, such as products or services. For example, and without limitation, if the machine translated target language string 108 is a product page for a non-stick cooking pan, the propositions represented in the translated target language string 108 might include the material that the cooking pan is made from, the type of cooking surface (e.g. non-stick) that the cooking pan provides, and whether the cooking pan is suitable for cleaning by a dishwasher. Other propositions can be identified for other types of things or groups of things. The proposition extraction module 110A can utilize a relation extraction method/algorithm trained on annotated training data to identify the propositions in the machine translated target language string 108.

The machine translation system 102 also operates in conjunction with a proposition extraction module 110B in some configurations. The proposition extraction module 110B is a software component (or a combination software and hardware component) that is configured to generate a list 112 of propositions represented in the source language string 104. The proposition extraction module 110B can utilize extraction guidelines 114 to identify the propositions in the source language string 104 in some configurations. The extraction guidelines 114 include data that defines the propositions that are to be identified in the source language string 104. For example, and without limitation, the extraction guidelines 114 might specify that the color, size, capacity, package size, and material are propositions that are to be extracted from the source language strings 104. The extraction guidelines 114 can specify other propositions that are to be extracted from the source language string 104 in other configurations.

The list 116 of propositions in the target language string 108 and the list 112 of propositions in the source language string 104 are provided to a proposition comparison module 118 in one configuration. The proposition comparison module 118 is a software component (or a combination software and hardware component) that performs a comparison between the list 116 of propositions in the target language string 108 and the list 112 of propositions in the source language string 104. In particular, the proposition comparison module 118 identifies those propositions in the list 112 of propositions in the source language string 104 that are correctly represented in the list 116 of propositions in the target language string 108. These propositions are illustrated in FIG. 1 as the correctly expressed propositions 120.

In some configurations, the proposition comparison module 118 also identifies those propositions in the list 112 of propositions in the source language string 104 that are missing from the target language string 108 or that are incorrectly represented in the list 116 of propositions in the target language string 108. These propositions are illustrated in FIG. 1 as the missing and incorrectly expressed propositions 122.

The proposition comparison module 118 can also utilize the correctly expressed propositions 120 and the missing and incorrectly express propositions 122 in order to create a machine translation quality score 124 for the machine translated target string 108 in some configurations. In one particular configuration, the machine translation quality score 124 is computed as a normalized score of $(k-w*m)/n$, where k is the number of correctly expressed propositions 120, m is the number of missing and incorrectly expressed propositions 122, n is the total number of propositions identified in the source language string, and w is a parameter that specifies a weight of misleading propositions. If w=0, then the machine translation quality score 124 simply reflects the proportion of correctly translated propositions. In other embodiments, the machine translation quality score 124 can be the output of a machine learning algorithm, taking the extracted and validated propositions as inputs and predicting some other metric (e.g. performance of the translation in a downstream metric, such as sales numbers, which depend on translation quality).

In some configurations, weights can be assigned to propositions in the source language string 104 that indicate the relative importance of a proposition being preserved in the machine translated target string 108. The assigned weights can be based upon the type of proposition or based upon user interaction with the propositions (e.g. when presented on a merchant site). The weights can be manually specified or automatically assigned, such as by inferring the weights through an analysis of the use of the propositions in other contexts. Propositions can also be divided into different types and a different weight can be learned for each proposition type by correlating with downstream metrics.

The process described above can be repeated for a large number of source language strings 104. For example, and without limitation, the process described above can be performed on all or a portion of the product records utilized by a merchant site. In this way, a machine translation quality score 124 is generated for each of the product records.

Once the process described above has been completed for a sufficiently large set (e.g. 400 or more) of source language strings 104, the proposition comparison module 118 (or another module) can compute a quality score 126 for the machine translation system 102. For example, and without limitation, the quality score 126 can be computed as the micro average or macro average of the individual machine translation quality scores 124 for the individual source language strings 104. The macro average is computed as the average of the ratio (i.e. the quality score) for every source language string. The micro average is computed by summing the correctly preserved propositions and incorrect propositions across all source language strings and then computing a single ratio for the whole set of ASINs. In the first case, every ASIN contributes equally (macro level), in the second case, every proposition contributes equally (micro level).

The quality score 126 for the machine translation system 102 can then be utilized to improve a measure of quality of the translations generated by the machine translation system 102. For example, and without limitation, one or more machine translation models utilized by the machine translation system 102 can be modified in view of the quality score 126 for the machine translation system 102 that has been computed in the manner described above. Additional details regarding this process will be provided below with regard to FIGS. 2A and 2B.

It is to be appreciated that the computer architecture shown in FIG. 1 has been simplified for discussion purposes. In particular, many more computing systems, networking components, software components, and other types of computing resources can be utilized to provide the functionality described above.

Figure 2A:
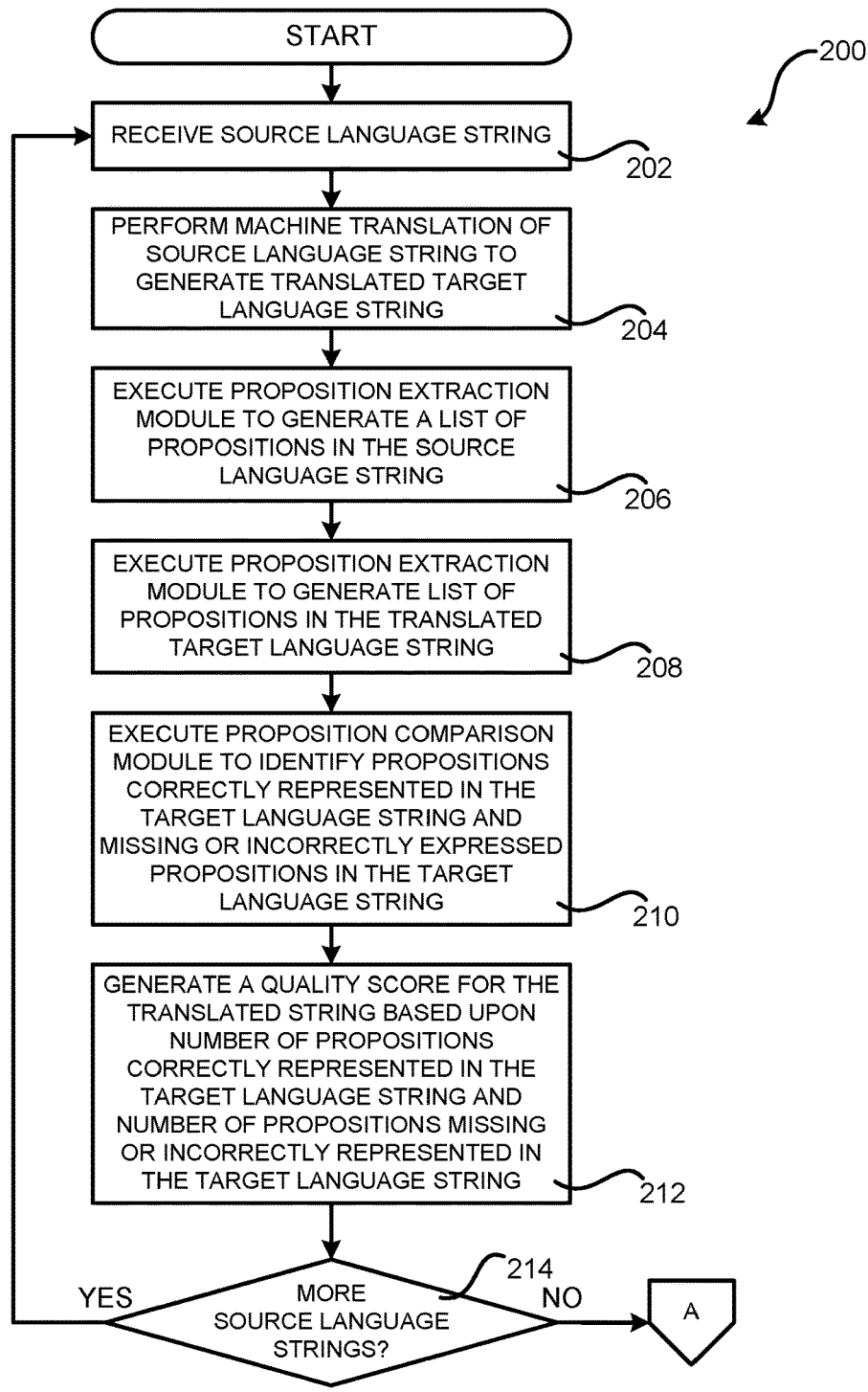
FIGS. 2A and 2B are flow diagrams showing a routine that illustrates additional aspects of the operation of the computing system shown in FIG. 1 for evaluating machine translation quality by matching propositions in source and translated strings, according to one particular configuration.
Figure 2B:
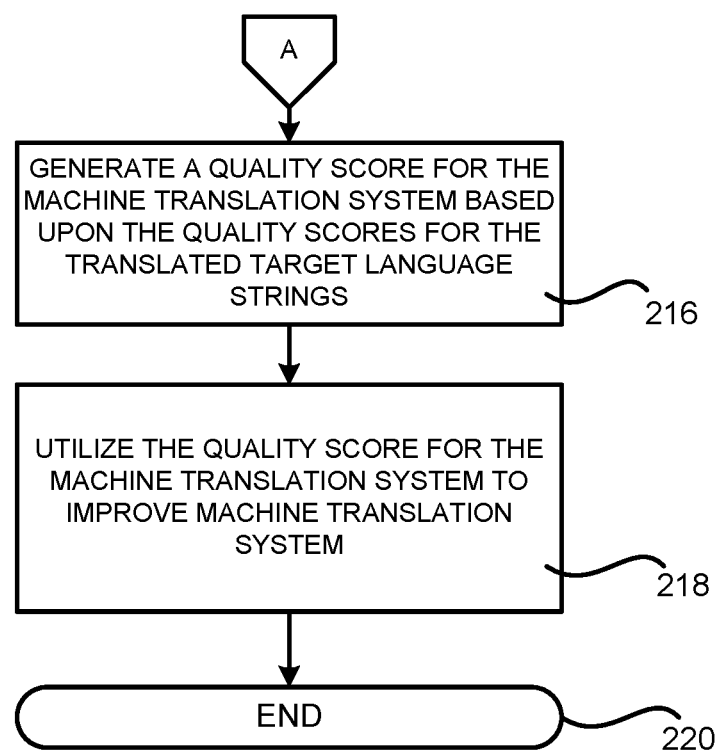

FIGS. 2A and 2B are flow diagrams showing a routine 200 that illustrates additional aspects of the operation of the computing system shown in FIG. 1 for evaluating machine translation quality by matching propositions in source language strings 104 and machine translated target language strings 108, according to one particular configuration. It is to be appreciated that the logical operations described herein with respect to FIGS. 2A and 2B, and the other FIGS., can be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special-purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 200 begins at operation 202, where the machine translation system 102 receives a source language string 104. As discussed above, the source language string 104 can be a textual description of a product available from a merchant site. The source language string 104 can include other types of content in other configurations.

From operation 202, the routine 200 proceeds to operation 204, where the machine translation system 102 performs a machine translation of the source language string 104 in a source human-readable language to a machine translated target language string 108 in a target human-readable language. Once the machine translated target language string 108 has been generated, the routine 200 proceeds from operation 204 to operation 206.

At operation 206, the proposition extraction module 110B is executed in order to generate the list 112 of propositions in the source language string 104. The proposition extraction module 110A is executed at operation 208 in order to generate the list 116 of propositions in the machine translated target language string 108. From operation 208, the routine 200 proceeds to operation 210.

At operation 210, the proposition comparison module 118 takes the list 112 of propositions in the source language string 104 and the list 116 of propositions in the machine translated target language string 108 and performs a comparison between the list 112 and the list 116. As discussed above, the proposition comparison module 118 can identify those propositions in the source language string 104 that are correctly represented (i.e. also contained in) in the machine translated target language string 108. The proposition comparison module 118 can also identify those propositions in the source language string 104 that are missing from the target language string 108 and those propositions in the source language string 104 that are present in the target language string 108 but that have been incorrectly represented (i.e. are not accurate representations of the corresponding proposition in the source language string 104).

From operation 210, the routine 200 proceeds to operation 212, where the proposition comparison module 118 (or another module or component) generates a quality score 124 for the machine translated target language string 108. As discussed above, the quality score 124 for the machine translated target language string 108 is computed in one configuration as a ratio of the number of propositions in the source language string 104 that are correctly represented in the target language string 108 minus the product of a weighting factor and the number of propositions in the source language string 104 that are missing from the target language string 108 and the number of propositions in the source language string 104 that are incorrectly represented in the target language string 108 divided by a total number of propositions in the source language string 104. The quality score 124 for the machine translated target language string 108 can be computed in other ways in other configurations.

From operation 212, the routine 200 proceeds to operation 214, where the proposition comparison module 118 (or another module or component) determines whether quality scores 124 are to be generated for additional source language strings 104. If so, the routine 200 proceeds from operation 214 back to operation 202, where quality scores 124 can be computed for additional source language strings 104 in a manner similar to that described above. The routine 200 proceeds from operation 214 to operation 216 if no additional source language strings 104 remain for which quality scores 124 are to be generated.

At operation 216, the proposition comparison module 118 (or another module or component) computes a quality score 126 for the machine translation system 102 based, at least in part, on the quality scores 124 generated for the source language strings 104 in the manner described above. As discussed above, the quality score 126 can be computed as the micro average or macro average of the individual machine translation quality scores 124 for the individual source language strings 104.

Once the quality score 126 for the machine translation system has been generated, the quality score 126 can be used to improve a measure of quality of the machine translation system 102 at operation 218. For example, and without limitation, one or more machine translation models utilized by the machine translation system 102 can be modified based upon the quality score 126 for the machine translation system 102 that has been computed in the manner described above. When the computation of the quality score is completely automated in the manner described herein, for instance, the quality score can be directly used in training the machine translation system 102. For example, the machine translation system 102 can be trained to optimize for the quality score 126. The routine 200 then proceeds from operation 218 to operation 220, where it ends.

Figure 3:
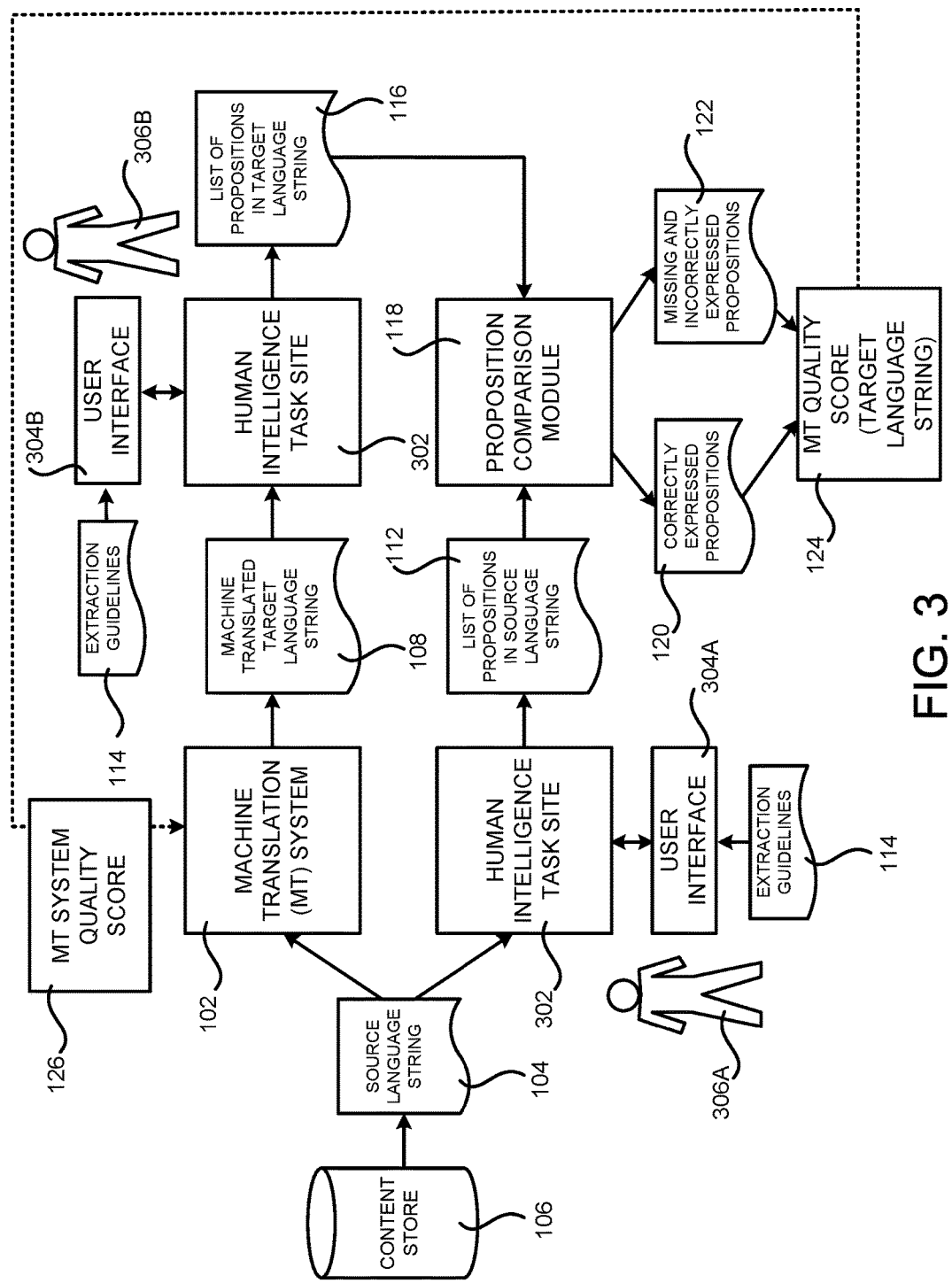
FIG. 3 is a computing system architecture diagram showing aspects of another computing system configured to provide functionality for evaluating machine translation quality by matching propositions in source and translated strings, according to one particular configuration.

FIG. 3 is a computing system architecture diagram showing aspects of another computing system configured to provide functionality for evaluating machine translation quality by matching propositions in source language strings 104 and machine translated target language strings 108, according to one particular configuration. In the configuration shown in FIG. 3, a human intelligence task site 302 is utilized to facilitate identification of the propositions in the source language string 104 by a human annotator 306A. The human annotator 306A should be fluent in the source human-readable language, but does not have to be fluent in the target human-readable language.

The human intelligence task site 302 provides functionality for providing a user interface 304A, such as a web-based user interface, to the human annotator 306A. The user interface 304A can present the source language string 104 to the human annotator 306A. The user interface 304A can also provide user interface controls through which the human annotator 306A can specify the propositions in the source language string 104. In order to facilitate the consistent selection of propositions in the source and target languages, the user interface 304A can also present the extraction guidelines 114 to the human annotator 306A in a human-readable format.

As illustrated in FIG. 3, the human intelligence task site 302 can also be utilized to facilitate identification of the propositions in the machine translated target language string 108 by a human annotator 306B. The human annotator 306B should be fluent in the target human-readable language, but does not have to be fluent in the source human-readable language.

The human intelligence task site 302 also provides functionality for providing a user interface 304B, such as a web-based user interface, to the human annotator 306B. The user interface 304B can present the machine translated target language string 108 to the human annotator 306B. The user interface 304B can also provide user interface controls through which the human annotator 306B can specify the propositions in the machine translated target language string 108. In order to facilitate the consistent selection of propositions in the source and target languages, the user interface 304B can also present the extraction guidelines 114 to the human annotator 306B in a human-readable format.

Once the human annotator 306A has specified the list 112 of propositions in the source language string 104 and the human annotator 306B has specified the list 116 of propositions in the target language string 108, the proposition comparison module 118 can compare the lists 112 and 116 in the manner described above in order to compute a quality score for the machine translated target language string 108. The machine translation quality score 126 can also be computed for the machine translation system 102 in the manner described above. Additional details regarding the use of a human intelligence task site 302 to identify propositions in a source language string 104 and a target language string 108 will be provided below with regard to FIGS. 4A and 4B.

Figure 4A:
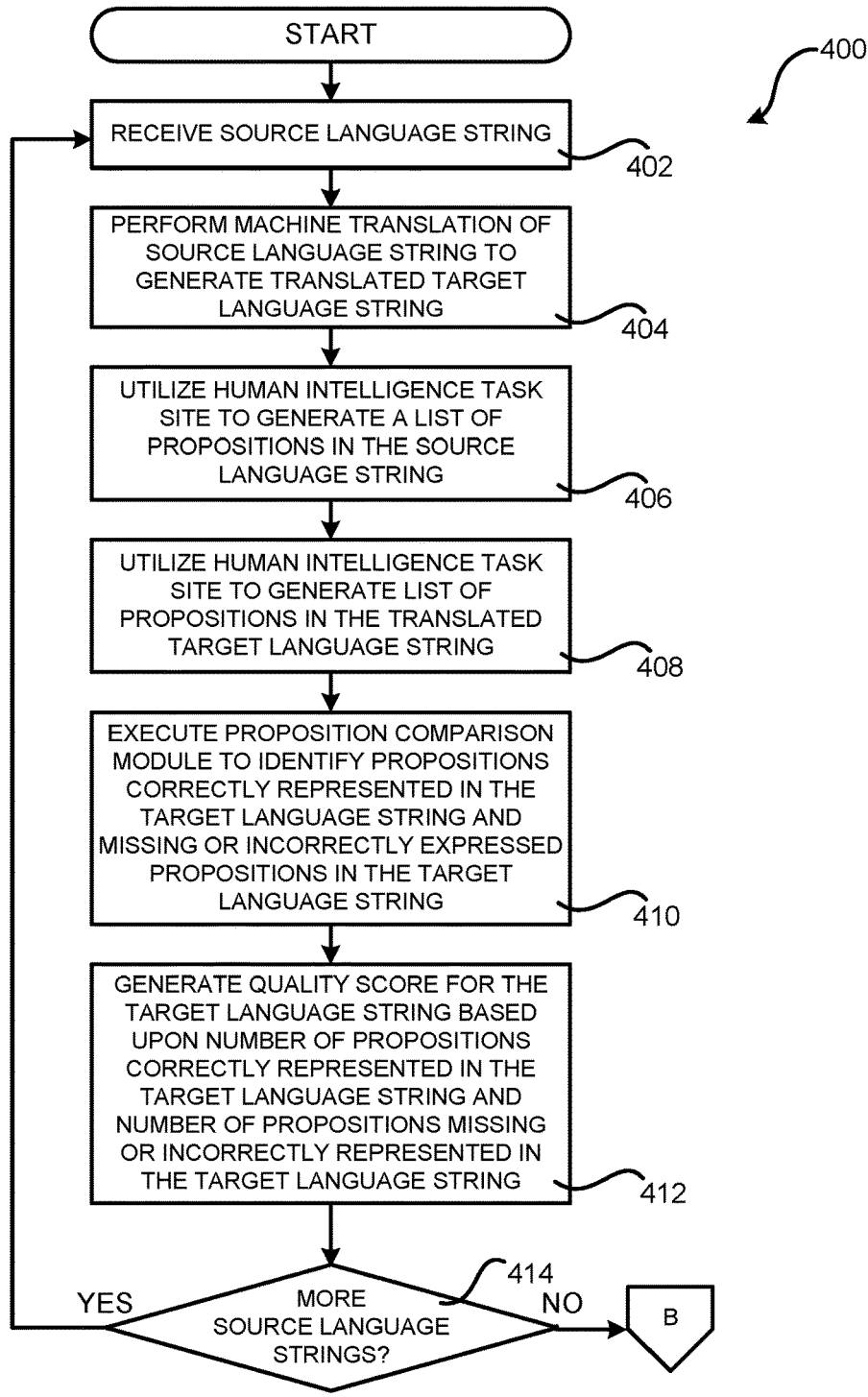
FIGS. 4A and 4B are flow diagrams showing a routine that illustrates additional aspects of the operation of the computing system shown in FIG. 3 for evaluating machine translation quality by matching propositions in source and translated strings, according to one particular configuration.
Figure 4B:
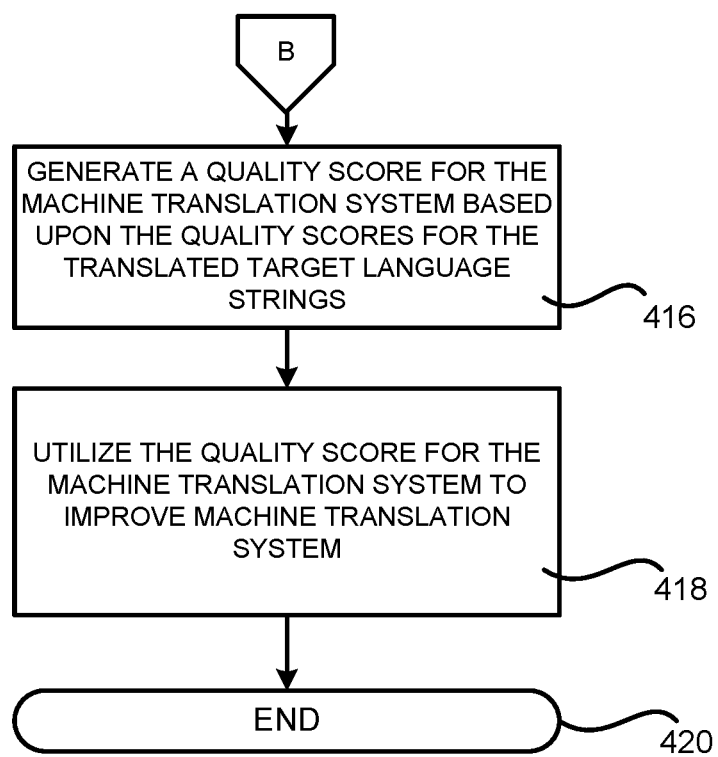

FIGS. 4A and 4B are flow diagrams showing a routine 400 that illustrates additional aspects of the operation of the computing system shown in FIG. 3 for evaluating machine translation quality by matching propositions in source language strings 104 and machine translated target language strings 108, according to one particular configuration. The routine 400 begins at operation 402, where the machine translation system 102 receives a source language string 104. As discussed above, the source language string 104 can be a textual description of a product available from a merchant site. The source language string 104 can include other types of content in other configurations.

From operation 402, the routine 400 proceeds to operation 404, where the machine translation system 102 performs a machine translation of the source language string 104 in a source human-readable language to a machine translated target language string 108 in a target human-readable language. Once the machine translated target language string 108 has been generated, the routine 400 proceeds from operation 404 to operation 406.

At operation 406, the human intelligence task site 302A is utilized in order to generate the list 112 of propositions in the source language string 104. In particular, and as described above, the human intelligence task site 302A can provide a user interface 304A to the human annotator 306A that includes the source language string 104. The human annotator 306A can then specify the propositions contained in the source language string 104 through the user interface 304A. As also discussed above, the extraction guidelines 114 can also be presented in the user interface 304A in order to assist the human annotator 306A. From operation 406, the routine 400 proceeds to operation 408.

At operation 408, the human intelligence task site 302B is utilized in order to generate the list 116 of propositions in the machine translated target language string 108. In particular, and as described above, the human intelligence task site 302B can provide a user interface 304B to the human annotator 306B that includes the machine translated target language string 108. The human annotator 306B can then specify the propositions contained in the machine translated target language string 108 through the user interface 304B. As also discussed above, the extraction guidelines 114 can also be presented in the user interface 304B in order to assist the human annotator 306B in the identification of propositions. From operation 408, the routine 400 proceeds to operation 410.

At operation 410, the proposition comparison module 118 takes the list 112 of propositions in the source language string 104 and the list 116 of propositions in the machine translated target language string 108 and performs a comparison between the list 112 and the list 116. As discussed above, the proposition comparison module 118 can identify those propositions in the source language string 104 that are correctly represented (i.e. also contained in) in the machine translated target language string 108. The proposition comparison module 118 can also identify those propositions in the source language string 104 that are missing from the target language string 108 and those propositions in the source language string 104 that are present in the target language string 108 but that have been incorrectly represented (i.e. are not accurate representations of the corresponding proposition in the source language string 104).

From operation 410, the routine 400 proceeds to operation 412, where the proposition comparison module 118 (or another module or component) generates a quality score 124 for the machine translated target language string 108. As discussed above, the quality score 124 for the machine translated target language string 108 is computed in one configuration as a ratio of the number of propositions in the source language string 104 that are correctly represented in the target language string 108 minus the product of a weighting factor and the number of propositions in the source language string 104 that are missing from the target language string 108 and the number of propositions in the source language string 104 that are incorrectly represented in the target language string 108 divided by a total number of propositions in the source language string 104. The quality score 124 for the machine translated target language string 108 can be computed in other ways in other configurations.

From operation 412, the routine 400 proceeds to operation 414, where the proposition comparison module 118 (or another module or component) determines whether quality scores 124 are to be generated for additional source language strings 104. If so, the routine 400 proceeds from operation 414 back to operation 402, where quality scores 124 can be computed for additional source language strings 104 in a manner similar to that described above. The routine 400 proceeds from operation 414 to operation 416 if no additional source language strings 104 remain for which quality scores 124 are to be generated.

At operation 416, the proposition comparison module 118 (or another module or component) computes a quality score 126 for the machine translation system 102 based, at least in part, on the quality scores 124 generated for the source language strings 104 in the manner described above. For example, and as discussed above, the quality score 126 can be computed as the micro average or macro average of the individual machine translation quality scores 124 for the individual source language strings 104.

Once the quality score 126 for the machine translation system has been generated, the quality score 126 can be used to improve a measure of quality of the machine translation system 102 at operation 218. For example, and without limitation, one or more machine translation models utilized by the machine translation system 102 can be modified based upon the quality score 126 for the machine translation system 102 that has been computed in the manner described above. The routine 400 then proceeds from operation 418 to operation 420, where it ends.

It is to be appreciated that the configurations described above are merely illustrative and that other configurations can be utilized. For example, and without limitation, the functionality disclosed herein can be exposed as a network service, for example when machine translation is also offered as a network service. Additionally, the configurations described above with regard to FIGS. 1 and 3 can be utilized in various configurations. For example, and without limitation, the proposition extraction module 110A can be utilized to generate the list 112 of propositions in the source language string 104 in conjunction with the use of the human intelligence task site 302B to generate the list 116 of propositions in the machine translated target language string 108. Similarly, the proposition extraction module 110B can be utilized to generate the list 116 of propositions in the machine translated target language string 108 in conjunction with the use of the human intelligence task site 302A to generate the list 112 of propositions in the source language string 104.

In other configurations, the human intelligence task site 302 can be utilized to verify propositions identified by the proposition extraction module 110. In yet other configurations, the human intelligence task site 302 can be utilized to generate training data for training the proposition extraction module 110. The proposition extraction module 110 can be utilized once it has been trained to identify propositions. Other configurations can also be utilized.

Figure 5:
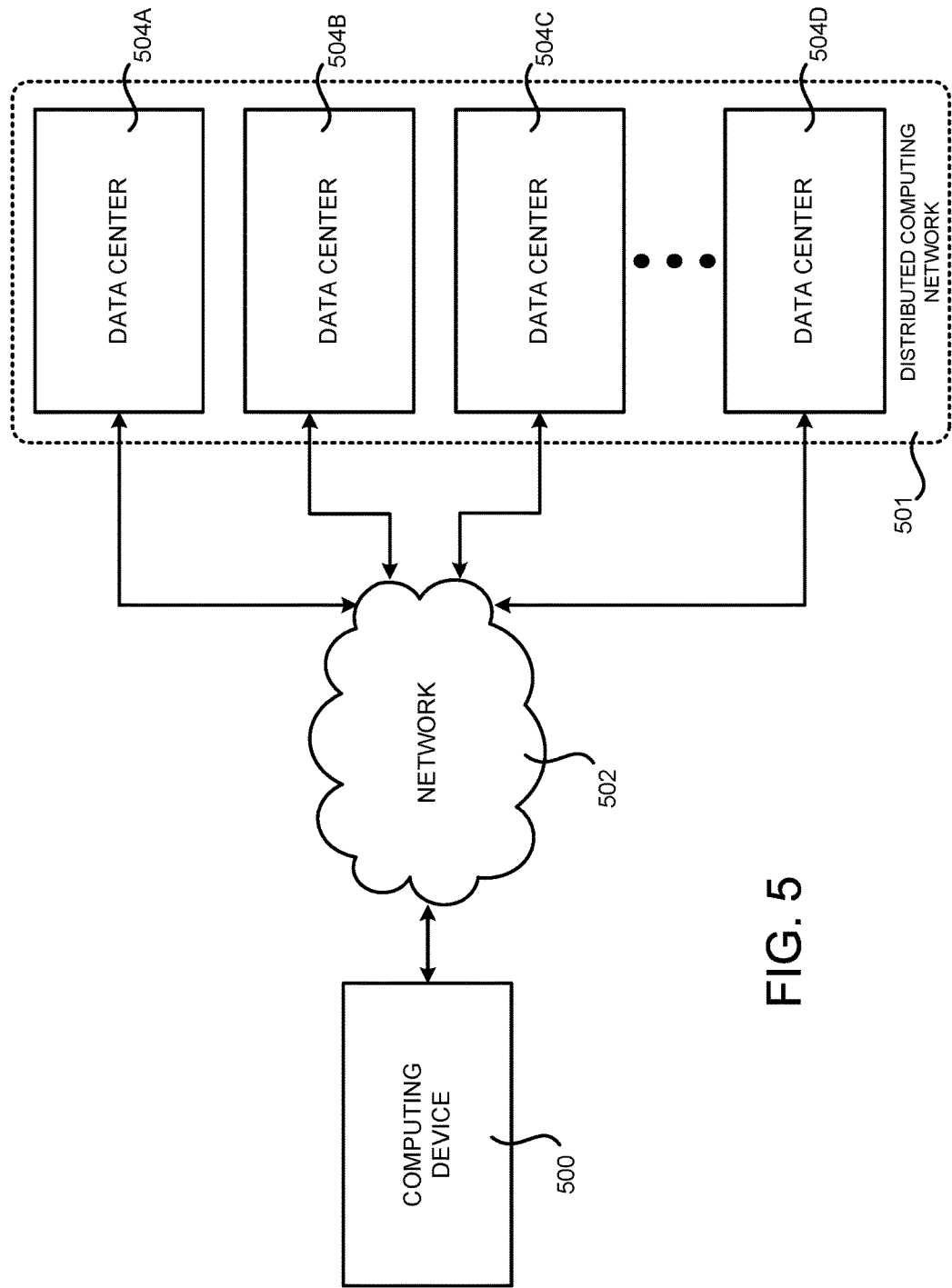
FIG. 5 is a system and network diagram that shows one illustrative operating environment for the configurations disclosed herein that includes a distributed computing network.

FIG. 5 is a system and network diagram that shows one illustrative operating environment for the configurations disclosed herein that includes a distributed computing network 501 that can be configured to implement the various technologies described above. The distributed computing network 501 can execute network services that provide computing resources on a permanent or an as-needed basis.

Among other types of functionality, the computing resources provided by the distributed computing network 501 can be utilized to implement the various software components described herein. The computing resources provided by the distributed computing network 501 can include various types of computing resources, such as data processing resources like VM instances, data storage resources, networking resources, data communication resources, network services, and the like.

Each type of computing resource provided by the distributed computing network 501 can be general-purpose or can be available in a number of specific configurations. For example, data processing resources can be available as physical computers or VM instances in a number of different configurations. The VM instances can be configured to execute applications, including Web servers, application servers, media servers, database servers, some or all of the software components described above, and/or other types of programs. Data storage resources can include file storage devices, block storage devices, and the like. The distributed computing network 501 can also be configured to provide other types of computing resources not mentioned specifically herein.

As also discussed above, the computing resources provided by the distributed computing network 501 are enabled in one implementation by one or more data centers 504A-504D (which might be referred to herein singularly as "a data center 504" or in the plural as "the data centers 504").

The data centers 504 are facilities utilized to house and operate computer systems and associated components. The data centers 504 typically include redundant and backup power, communications, cooling, and security systems. The data centers 504 can also be located in geographically disparate locations. One illustrative configuration for a data center 504 that can be utilized to implement the technologies disclosed herein will be described below with regard to FIG. 6.

Users of the distributed computing network 501 can access the computing resources provided by the distributed computing network 501 over a network 502, which can be a wide area communication network ("WAN"), such as the Internet, an intranet or an Internet service provider ("ISP") network or a combination of such networks. For example, and without limitation, a computing device 500 operated by a user of the distributed computing network 501 can be utilized to access the distributed computing network 501 by way of the network 502. It should be appreciated that a local-area network ("LAN"), the Internet, or any other networking topology known in the art that connects the data centers 504 to remote users can be utilized. It should also be appreciated that combinations of such networks can also be utilized.

Figure 6:
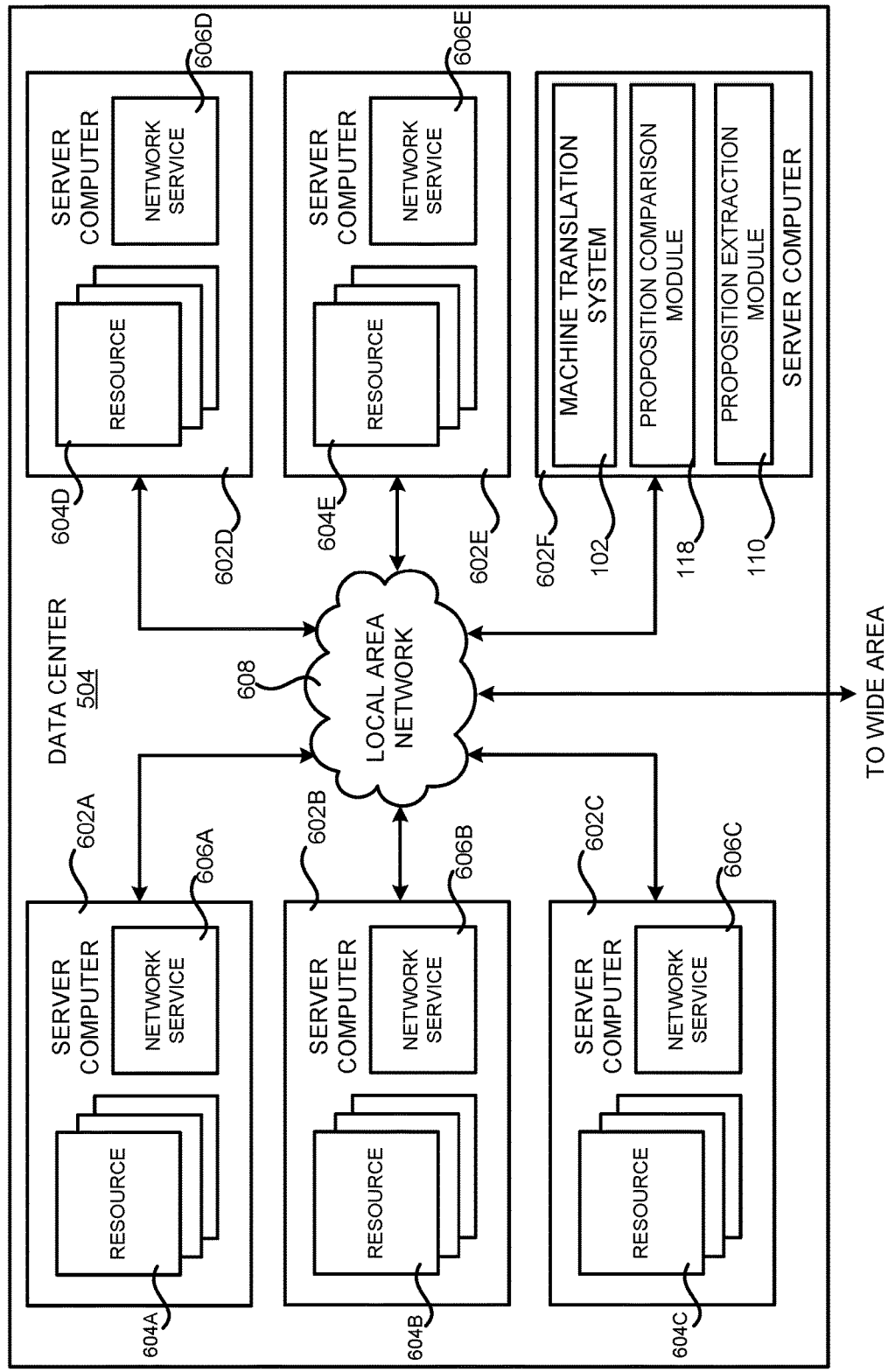
FIG. 6 is a computing system diagram illustrating a configuration for a data center that can be utilized to implement aspects of the technologies disclosed herein.

FIG. 6 is a computing system diagram that illustrates one configuration for a data center 504 that implements aspects of the technologies disclosed herein. The example data center 504 shown in FIG. 6 includes several server computers 602A-602F (which might be referred to herein singularly as "a server computer 602" or in the plural as "the server computers 602") for providing the computing resources 604A-604E.

The server computers 602 can be standard tower, rackmount, or blade server computers configured appropriately for providing the computing resources 604 described herein (illustrated in FIG. 6 as the computing resources 604A-604E). As mentioned above, the computing resources 604 provided by the distributed computing network 501 can be data processing resources such as VM instances or hardware computing systems, data storage resources, database resources, networking resources, and others. Some of the servers 602 can also be configured to execute network services 606A-606E, respectively, capable of instantiating, providing and/or managing the computing resources 604.

The data center 504 shown in FIG. 6 also includes a server computer 602F that can execute some or all of the software components described above. For example, and without limitation, the server computer 602F can be configured to execute the machine translation system 102, the proposition extraction module 110, and the proposition comparison module 118, which were described in detail above. The server computer 602F can also be configured to execute other components and/or to store data for providing some or all of the functionality described herein. In this regard, it should be appreciated that the various software components disclosed herein can execute on many other physical or virtual servers in the data centers 504 in various configurations.

In the example data center 504 shown in FIG. 6, an appropriate LAN 608 is also utilized to interconnect the server computers 602A-602F. The LAN 608 is also connected to the network 502 illustrated in FIG. 5. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 504A-504D, between each of the server computers 602A-602F in each data center 504, and, potentially, between computing resources 604 in each of the data centers 504. It should be appreciated that the configuration of the data center 504 described with reference to FIG. 6 is merely illustrative and that other implementations can be utilized.

Figure 7:
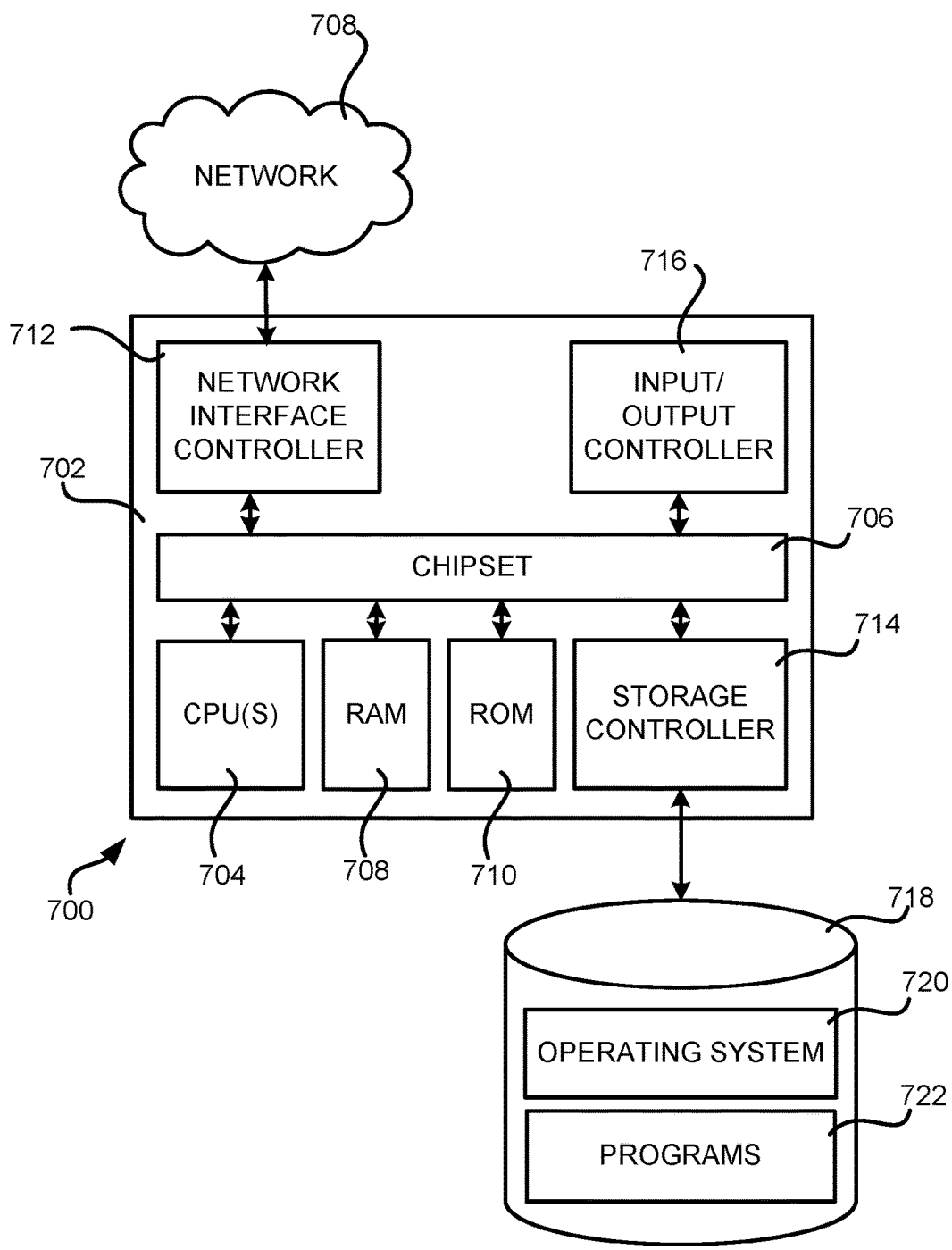
FIG. 7 is a computer architecture diagram showing an illustrative computer hardware architecture for implementing a computing device that can be utilized to implement aspects of the various technologies presented herein.

FIG. 7 shows an example computer architecture for a computer 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 708. The chipset 706 can include functionality for providing network connectivity through a NIC 712, such as a gigabit Ethernet adapter. The NIC 712 is capable of connecting the computer 700 to other computing devices over the network 708. It should be appreciated that multiple NICs 712 can be present in the computer 700, connecting the computer to other types of networks and remote computer systems.

The computer 700 can be connected to a mass storage device 718 that provides non-volatile storage for the computer. The mass storage device 718 can store an operating system 720, programs 722, and data, which have been described in greater detail herein. The mass storage device 718 can be connected to the computer 700 through a storage controller 714 connected to the chipset 706. The mass storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the mass storage device 718 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 718 is characterized as primary or secondary storage, and the like.

For example, the computer 700 can store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the mass storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 718 can store an operating system 720 utilized to control the operation of the computer 700. According to one configuration, the operating system comprises the LINUX operating system. According to another configuration, the operating system comprises the WINDOWS® SERVER operating system from MICROSOFT CORPORATION. According to further configurations, the operating system can comprise the UNIX operating system or one of its variants. It should be appreciated that other operating systems can also be utilized. The mass storage device 718 can store other system or application programs and data utilized by the computer 700.

In one configuration, the mass storage device 718 or other computer-readable storage media is encoded with computer-executable instructions which, when loaded into the computer 700, transform the computer from a general-purpose computing system into a special-purpose computer capable of implementing the configurations described herein. These computer-executable instructions transform the computer 700 by specifying how the CPUs 704 transition between states, as described above. According to one configuration, the computer 700 has access to computer-readable storage media storing computer-executable instructions which, when executed by the computer 700, perform the various processes described above with regard to FIGS. 1-4. The computer 700 can also include computer-readable storage media for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, a plotter, or other type of output device. It will be appreciated that the computer 700 might not include all of the components shown in FIG. 7, can include other components that are not explicitly shown in FIG. 7, or might utilize an architecture completely different than that shown in FIG. 7.

Based on the foregoing, it should be appreciated that technologies for evaluating machine translation quality by matching propositions in source language and translated target language strings have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. An apparatus, comprising:
   one or more processors; and
   one or more non-transitory computer-readable storage media having instructions stored thereupon that are executable by the one or more processors and which, when executed, cause the apparatus to:
   receive a source language string expressed in a source language;
   receive a target language string comprising a machine translation of the source language string into a target language generated by a machine translation system;
   identify propositions in the source language string;

identify propositions in the target language string;
perform a comparison between the propositions identified in the source language string and the propositions identified in the target language string;
generate a quality score for the target language string based, at least in part, on the comparison between the propositions identified in the source language string and the propositions identified in the target language string;
generate a quality score for the machine translation system based, at least in part, on the quality score generated for the target language string; and
utilize the quality score for the machine translation system to improve a measure of quality of the machine translation system.

2. The apparatus of claim 1, wherein perform a comparison between the propositions identified in the source language string and the propositions identified in the target language string comprises:
identifying a number of propositions in the source language string that are correctly represented in the target language string; and
identifying a number of propositions in the source language string that are missing from the target language string or that are incorrectly represented in the target language string.

3. The apparatus of claim 2, wherein the quality score for the target language string is computed as a ratio of the number of propositions in the source language string that are correctly represented in the target language string minus the product of a weighting factor and the number of propositions in the source language string that are incorrectly represented in the target language string divided by a total number of propositions in the source language string.

4. The apparatus of claim 1, wherein the propositions in the source language string or the propositions in the target language string are identified by a proposition extraction module.

5. The apparatus of claim 4, wherein a human intelligence task site is configured to present a user interface for validating the propositions identified in the target language string.

6. The apparatus of claim 1, wherein the propositions in the source language string or the propositions in the target language string are identified using a human intelligence task site configured to present the source language string or the target language string in a user interface and to receive an identification of the propositions in the source language string or the propositions in the target language string through the user interface.

7. The apparatus of claim 6, wherein the human intelligence task site is further configured to present extraction guidelines in the user interface.

8. A computer-implemented method, comprising:
identify first propositions in a first string, at least one of the first propositions comprising a first word or phrase that describes a first object of the first string, the first string being expressed using a first human-readable language;
identify second propositions in a second string, at least one of the second propositions comprising a second word or phrase that describes a second object of the second string, the second string comprising a machine translation of the first string into a second human-readable language by a machine translation system;
perform a comparison between the first propositions and the second propositions;
generate a quality score for the second string based, at least in part, on the comparison between the first propositions and second propositions; and
generate a quality score for the machine translation system based, at least in part, on the quality score generated for the second string.

9. The computer-implemented method of claim 8, wherein perform a comparison between the first propositions and the second propositions comprises:
identifying a number of propositions in the first string that are correctly represented in the second string; and
identifying a number of propositions in the first string that are missing from the second string or that are incorrectly represented in the second string.

10. The computer-implemented method of claim 9, wherein the quality score for the second string is computed as a ratio of the number of propositions in the first string that are correctly represented in the second string minus the product of a weighting factor and the number of propositions in the first string that are incorrectly represented in the second string divided by a total number of propositions in the first string.

11. The computer-implemented method of claim 8, wherein the propositions in the source language string or the propositions in the target language string are identified by a proposition extraction module.

12. The computer-implemented method of claim 11, wherein a human intelligence task site is configured to present a user interface for validating the propositions identified in the target language string.

13. The computer-implemented method of claim 8, wherein the propositions in the source language string or the propositions in the target language string are identified using a human intelligence task site configured to present the source language string or the target language string in a user interface and to receive an identification of the propositions in the source language string or the propositions in the target language string through the user interface.

14. The computer-implemented method of claim 13, wherein the human intelligence task site is further configured to present extraction guidelines in the user interface.

15. A non-transitory computer-readable storage media having instructions stored thereupon that are executable by one or more processors and which, when executed, cause the one or more processors to:
identify first propositions in a first string, at least one of the first propositions comprising a first word or phrase that describes a first object of the first string, the first string expressed using a first human-readable language;
identify second propositions in a second string, at least one of the second propositions comprising a second word or phrase that describes a second object of the second string, the second string comprising a machine translation of the first string;
perform a comparison between the first propositions and the second propositions;
generate a quality score for the second string based, at least in part, on the comparison between the first propositions and second propositions; and
generate a quality score for the machine translation system based, at least in part, on the quality score generated for the second string.

16. The non-transitory computer-readable storage media of claim 15, wherein perform a comparison between the first propositions and the second propositions comprises:
identifying a number of propositions in the first string that are correctly represented in the second string; and identifying a number of propositions in the first string that are missing from the second string or that are incorrectly represented in the second string.

17. The non-transitory computer-readable storage media of claim 16, wherein the quality score for the second string is computed as a ratio of the number of propositions in the first string that are correctly represented in the second string minus the product of a weighting factor and the number of propositions in the first string that are incorrectly represented in the second string and the number of propositions in the first string that are incorrectly represented in the second string divided by a total number of propositions in the first string.

18. The non-transitory computer-readable storage media of claim 17, wherein the propositions in the source language string or the propositions in the target language string are identified by a proposition extraction module.

19. The non-transitory computer-readable storage media of claim 18, wherein a human intelligence task site is configured to present a user interface for validating the propositions identified in the target language string.

20. The non-transitory computer-readable storage media of claim 15, wherein the propositions in the source language string or the propositions in the target language string are identified using a human intelligence task site configured to present the source language string or the target language string in a user interface and to receive an identification of the propositions in the source language string or the propositions in the target language string through the user interface.

* * * * *